(12) United States Patent
Ohn et al.

(10) Patent No.: US 10,882,507 B2
(45) Date of Patent: Jan. 5, 2021

(54) VEHICLE HAVING DRIVE MOTOR AND METHOD OF CONTROLLING THE SAME

(71) Applicants: Hyundai Motor Company, Seoul (KR); Kia Motors Corporation, Seoul (KR)

(72) Inventors: Hyung-Seuk Ohn, Seoul (KR); Young-Un Kim, Gyeonggi-do (KR); Jae-Sang Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 16/179,928

(22) Filed: Nov. 3, 2018

(65) Prior Publication Data
US 2019/0275999 A1 Sep. 12, 2019

(30) Foreign Application Priority Data
Mar. 9, 2018 (KR) .................. 10-2018-0028163

(51) Int. Cl.
| | |
|---|---|
| *B60W 10/08* | (2006.01) |
| *B60L 15/20* | (2006.01) |
| *B60L 50/16* | (2019.01) |
| *B60K 6/48* | (2007.10) |

(52) U.S. Cl.
CPC ............ *B60W 10/08* (2013.01); *B60L 15/20* (2013.01); *B60L 50/16* (2019.02); *B60K 6/48* (2013.01); *B60L 2240/10* (2013.01); *B60L 2240/423* (2013.01); *B60W 2710/083* (2013.01)

(58) Field of Classification Search
CPC ... B60W 10/08; B60W 30/1843; B60L 50/16; B60L 2240/425; B60L 15/20; B60L 50/61
See application file for complete search history.

(56) References Cited

U.S. PATENT DOCUMENTS

| | | | | |
|---|---|---|---|---|
| 2009/0211826 | A1* | 8/2009 | Hashimoto | B60K 6/365 180/65.275 |
| 2012/0101677 | A1* | 4/2012 | Ikegami | B60W 10/06 701/22 |
| 2014/0222265 | A1* | 8/2014 | Miftakhov | B60L 15/2045 701/22 |
| 2016/0023573 | A1* | 1/2016 | Turnbull | H02P 9/68 701/22 |
| 2016/0101771 | A1* | 4/2016 | Hata | B60W 20/00 701/22 |

FOREIGN PATENT DOCUMENTS

KR 2014-0048678 A 4/2014

* cited by examiner

*Primary Examiner* — Alan D Hutchinson
*Assistant Examiner* — Andy Schneider
(74) *Attorney, Agent, or Firm* — Mintz Levin Cohn Ferris Glovsky and Popeo, P.C.; Peter F. Corless

(57) ABSTRACT

A vehicle having a drive motor is provided. The vehicle includes a controller that changes the inclination of a drive motor torque command based on a demand torque of a driver or a temperature of a drive motor. A motor controller then operates the drive motor to change the motor torque changes based on the inclination of the motor torque command.

16 Claims, 9 Drawing Sheets

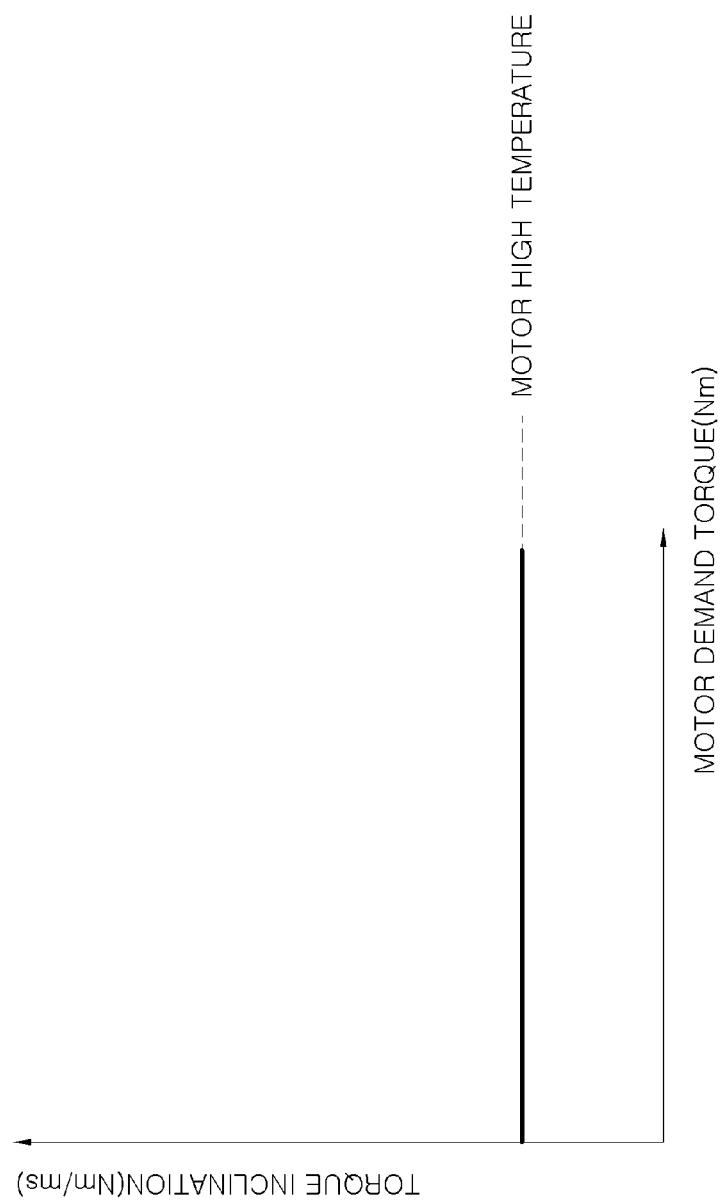

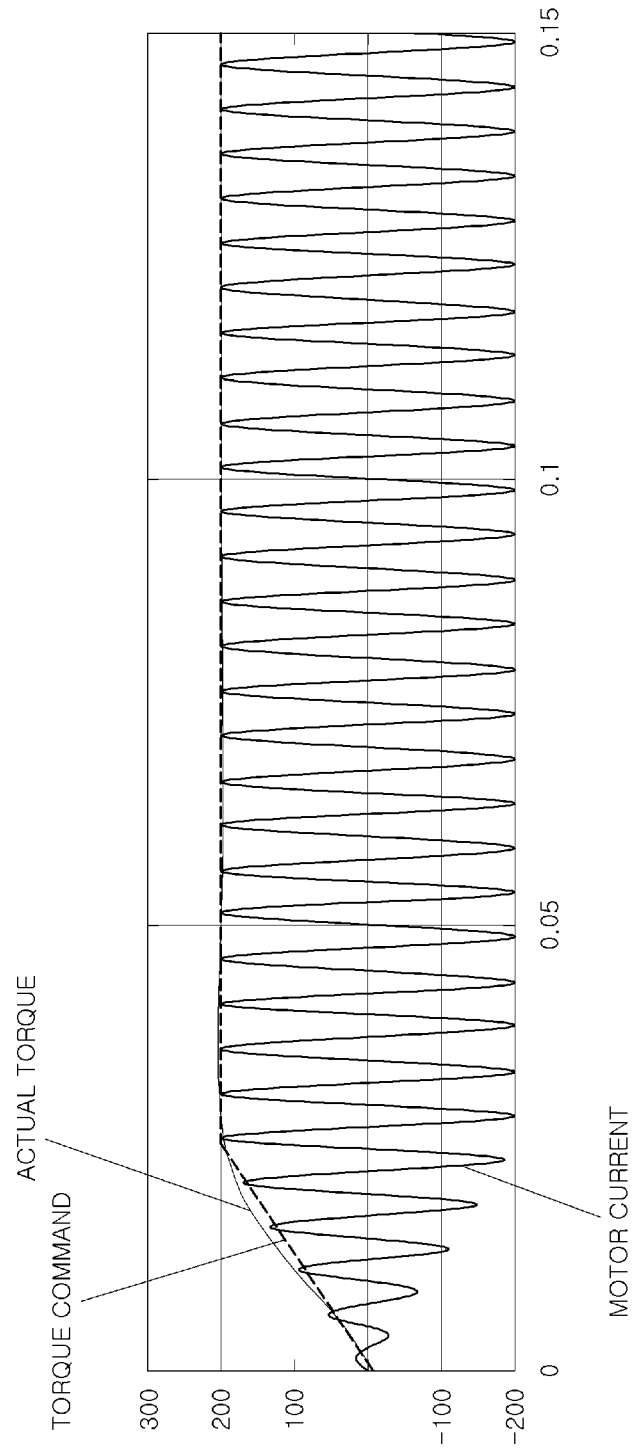

VEHICLE HAVING DRIVE MOTOR AND METHOD OF CONTROLLING THE SAME

CROSS-REFERENCE TO RELATED APPLICATIONS

This application claims priority to Korean Patent Application No. 10-2018-0028163, filed on Mar. 9, 2018, which is incorporated herein by reference in its entirety.

BACKGROUND

Field of the Disclosure

The present disclosure relates to a vehicle having a drive motor and a method of controlling the same, and more particularly, to an eco-friendly vehicle to which a drive motor is applied such as a hybrid vehicle and a method of controlling a motor torque of the vehicle.

Description of Related Art

As concern related to the global environmental pollution increases, the importance of using pollution-free energy has also been increasing. Particularly, to alleviate the problem of the exhaust gas of the automobile, the eco-friendly vehicle including a hybrid vehicle or an electric vehicle are being actively developed. The eco-friendly vehicle refers to a vehicle with low emission such as a pure electric vehicle (EV), a hybrid electric vehicle (HEV), or a fuel cell electric vehicle (FCEV) that drives using a drive motor as a driving source, and the driving is performed by converting direct current (DC) power stored in a battery into alternating current (AC) power to operate the drive motor and delivering the driving force of the drive motor to a driving wheel.

However, a demand torque command for the drive motor has, according to the related art as illustrated in FIG. 6, the shape of discontinuous step function from current motor torque to the demand torque. In particular, upon application of the torque command, the motor current changes discontinuously, abruptly thus causing damage to an element due to the over-current. Accordingly, as illustrated in FIG. 6, a method of slowly increasing the torque and motor current to the demand torque level by giving the inclination to the torque command is used. The contents described in this section are to merely help the understanding of the background of the present disclosure, and may include what is not previously known to those skilled in the art to which the present disclosure pertains.

SUMMARY

In the conventional techniques, when slowly increasing the torque and the motor current to the demand torque level by giving the inclination to the torque command, the motor torque inclination could always maintain the same inclination regardless of the torque command (demand torque level) and the motor temperature. Particularly, the then-inclination was set assuming the worst situation to prevent the over-current and protect the element. For example, according to the related art as illustrated in FIG. 7, the inclination of the torque command is set assuming the highest temperature situation regarding the operating temperature range of the motor, and the inclination of the torque command has been controlled to slowly increase the motor current to the demand torque level based on the inclination of the predetermined torque command regardless of the motor demand torque level or actual motor temperature.

The conventional control method is advantageous in terms of the over-current prevention and the element protection, but the torque command inclination is very small in general fuel efficiency mode operation region, and thus, the time to reach the demand torque from current torque increases substantially. The delay in reaching the demand torque, particularly, in the hybrid vehicle, causes the reduction in the responsiveness upon switching from the EV mode in which the vehicle is operated by the drive motor into the HEV mode in which the vehicle is operated by the drive motor and the engine, and thus causing the deterioration of the drivability.

Accordingly, the object of the present disclosure is to provide a control method that may improve the responsiveness of the motor torque through the variable control of the inclination of the motor torque command and the vehicle applying the control method. The present disclosure solves the problem by changing the inclination of the motor torque command based on the motor demand torque amount (the torque command) or the motor temperature.

More specifically, the present disclosure may include a controller configured to change the inclination (e.g., slope) of a drive motor torque command based on the demand torque of a driver or the temperature of a drive motor; and a motor controller configured to operate the drive motor to cause the motor torque to change based on the inclination of the motor torque command.

The controller may further be configured to reduce the inclination of the drive motor torque command as the demand torque increases. In particular, the controller may be configured to reduce the inclination of the drive motor torque command as the temperature of the drive motor increases. The controller may also be configured to change the inclination of the drive motor torque command based on the demand torque of the driver and the temperature of the drive motor, reduce the inclination of the drive motor torque command as the demand torque increases, and reduce the inclination of the drive motor torque command as the temperature of the drive motor increases.

Additionally, when the temperature of the drive motor is constant, the controller may be configured to maintain the inclination of the drive motor constant based on the change in the demand torque value in a low torque region and a high torque region of a predetermined range, and thus, the inclination of the drive motor may change based on the change in the demand torque value between the low torque region and the high torque region.

The vehicle may be a hybrid vehicle operated by the engine and the drive motor, and the controller may be a hybrid controller. The vehicle may further include an engine controller configured to operate the engine to change the engine torque based on the inclination of the engine torque. The engine controller may be configured to determine the inclination of the engine torque command based on the demand torque and the inclination of the motor torque command. Additionally, the controller may be configured to change the inclination of the drive motor torque command when switching from an EV mode into a HEV mode. The vehicle may further include a first drive motor having an input shaft directly connected with the engine, and a second drive motor having two drive motors directly connected to the first drive motor directly connected thereto.

A control method in accordance with the present disclosure for controlling the vehicle having the drive motor may include computing the demand torque of a driver; measuring the temperature of the drive motor; changing the inclination of a drive motor torque command based on the size of the demand torque of the driver or the temperature of the drive motor; and operating the drive motor to change the motor torque based on the changed inclination of the motor torque command. In particular, the method described herein may be executed by the controller having a processor and a memory.

In particular, the demand torque of the driver may be computed by at least any one of the operation state of an acceleration pedal, the operation state of a brake pedal, a vehicle speed, and a gear stage. The various states may be detected by one or multiple sensors mounted within the vehicle. The changing of the inclination of the drive motor torque command reduces the inclination of the drive motor torque command as the demand torque increases. Additionally, the changing of the inclination of the drive motor torque command reduces the inclination of the drive motor torque command as the temperature of the drive motor increases.

Further, the changing of the inclination of the drive motor torque command reduces the inclination of the drive motor torque command as the demand torque increases, and reduces the inclination of the drive motor torque command as the temperature of the drive motor increases. When the temperature of the drive motor is constant, the inclination of the drive motor may be maintained constant based on the change in the demand torque value in a low torque region and a high torque region of a predetermined range, and thus, the inclination of the drive motor may be changed based on the change in the demand torque value between the low torque region and the high torque region.

The control method may further include determining the inclination of the torque command of the engine torque based on the demand torque and the inclination of the motor torque; and adjusting the engine torque based on the determined inclination of the torque command of the engine torque.

According to the exemplary embodiment of the present disclosure, it may be possible to improve the responsiveness of the motor torque in the eco-friendly vehicle having the drive motor. Particularly, upon switching from the EV mode into the HEV mode of the hybrid vehicle, it may be possible to decrease the engine starter cranking time and the time to synchronize the speeds of the motor and the engine, thus remarkably improving the responsiveness upon the switching of the mode. In addition, in the hybrid vehicle that removes the existing fly wheel and replaces it by the motor, it may be possible to apply the exemplary embodiment of the present disclosure to improve the responsiveness of the motor torque, thus improving the problems of the vibration and noise occurrence.

BRIEF DESCRIPTION OF THE DRAWINGS

A brief description of each drawing is provided to more sufficiently understand drawings used in the detailed description of the present invention.

FIG. 7 is a graph illustrating the line of the inclination of the torque command upon the motor torque control in accordance with the conventional control method;

FIG. 8B is a graph illustrating the result that performs the motor torque control by applying the method in accordance with an exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a detailed description for embodying the present disclosure will be made in detail with reference to the accompanying drawings.

Figure 1:
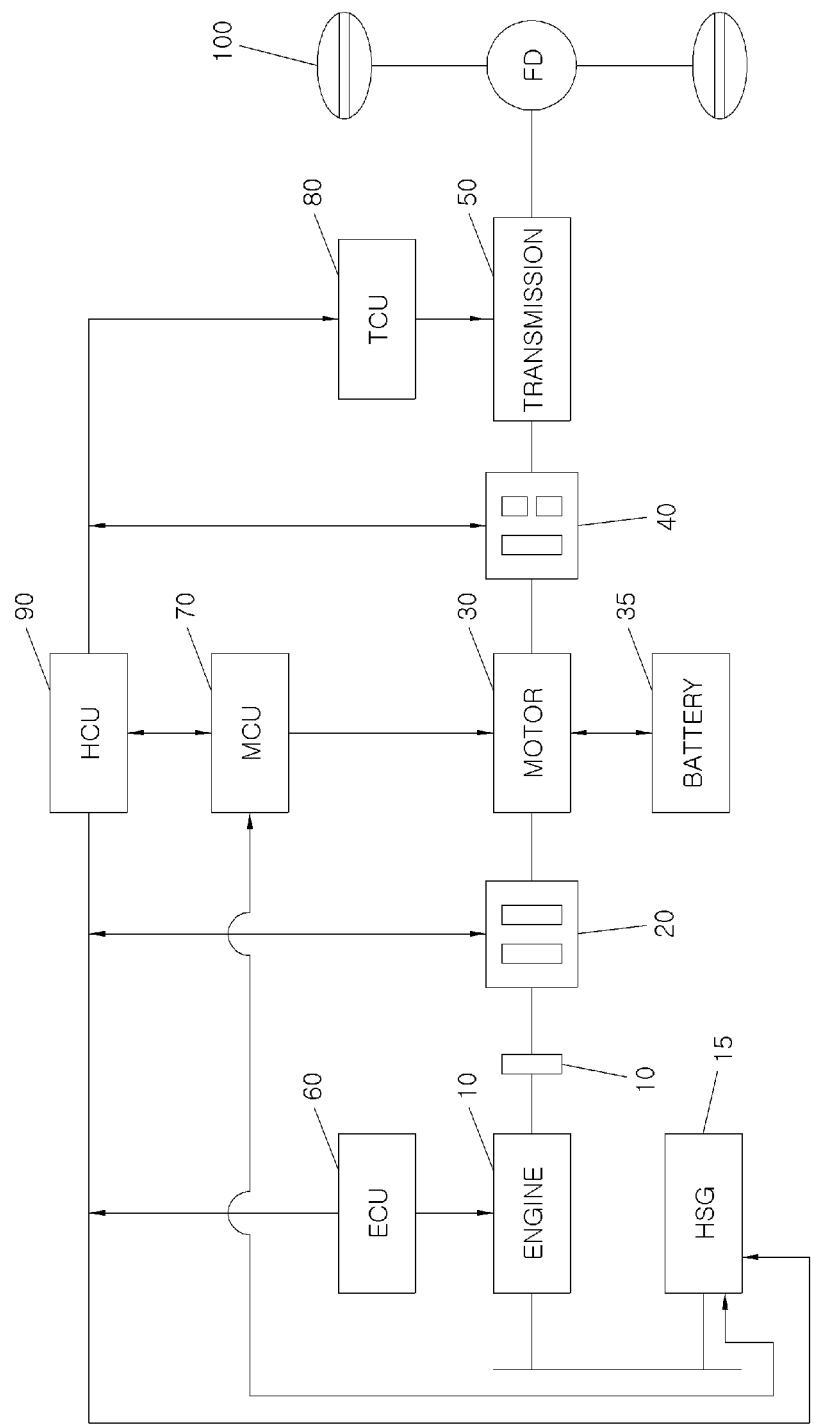
FIG. 1 is a diagram illustrating a hybrid vehicle in accordance with an exemplary embodiment of the present disclosure.

FIG. 1 is a diagram illustrating, as a block diagram, the configuration of a vehicle in accordance with the exemplary embodiment of the present disclosure. As illustrated in FIG. 1, the vehicle in accordance with the exemplary embodiment of the present disclosure includes a controller 90 configured to change the inclination (e.g., slope) of a drive motor torque command based on the demand torque of a driver or the temperature of a drive motor, and a motor controller 70 configured to operate the drive motor to change the motor torque based on the inclination of the torque command.

An engine 10 burns fuel to generate power for the vehicle operation based on the operation of an engine controller 60. A motor 30 generates a driving force by the power supplied from a battery 35 to assist the power of the engine 10 or to operate the vehicle by the driving force of the motor 30 based on the operation of the motor controller 70.

As illustrated in FIG. 1, the output shaft of the engine 10 that is an internal combustion engine may be connected with the motor 30 by an engine clutch 20. The engine clutch may be interposed between the engine 10 and the motor 30 and may be configured to receive a control signal from the controller 90 to operate as a connection between the engine 10 and the motor 30. Upon operation in the EV mode operated by the operation of the motor 30 of the vehicle, the connection of the engine 10 and the motor 30 may be released thus preventing the delivery of the power of the engine 10 to the motor 30; and upon operation in the HEV mode operated by the powers of the engine 10 and the motor 30, the engine 10 and the motor 30 are engaged.

The motor 30 and the engine 10 may be connected to a transmission 50 through a dual clutch 40. The dual clutch 40 may include two clutches, and each clutch may operate as selectively delivering the powers of the engine 10 and the motor 30 to the transmission 50. The transmission 50 may be configured to convert the power generated from the power source into the rotational force required for a targeting vehicle speed to deliver the power to a vehicle wheel 100.

Additionally, a hybrid starter and generator (HSG) 15 for starting by cranking the engine upon start may be disposed within the engine 10. The hybrid starter and generator (HSG) 15 may be configured to operate as the generator charging the surplus output after starting the engine 10 to charge the battery, in addition to cranking and starting the engine 10 by the operation of a starter motor connected through the input shaft and a belt, etc. of the engine 10. The starter motor may be operated to satisfy the inclination of a predetermined torque command based on the operation of the motor controller 70.

A fly wheel 11 may be connected to the crank shaft of the engine 10 for power transfer, and may be configured to simultaneously rotate based on the rotation of the engine. The fly wheel mitigates the irregular rotational force generated during the explosion stroke of the internal combustion engine to transfer the force to the vehicle wheel 100.

The controller 90, as the top-level controller for operating each element of the above-described vehicle, may be a hybrid controller (HCU) configured to integrally operate the hybrid vehicle by operating the engine controller 60, the motor controller 70, and a transmission controller 80. As will be described later, the controller 90 may be configured to change the inclination of the drive motor torque command based on the demand torque of the driver or the temperature of the drive motor.

Hereinafter, referring to FIGS. 4 to 7, a difference between the control method using the controller 90 and the motor controller 70 of the vehicle in accordance with the exemplary embodiment of the present disclosure and the conventional control method will be described in more detail. The controller 90 may be configured to calculate the motor demand torque of the driver using the information related to the operation state of an acceleration pedal, the operation state of a brake pedal, a vehicle speed, and a gear stage that are measured from each sensor mounted to a vehicle body. In other words, a torque command value of the motor torque may be determined.

Figure 4:
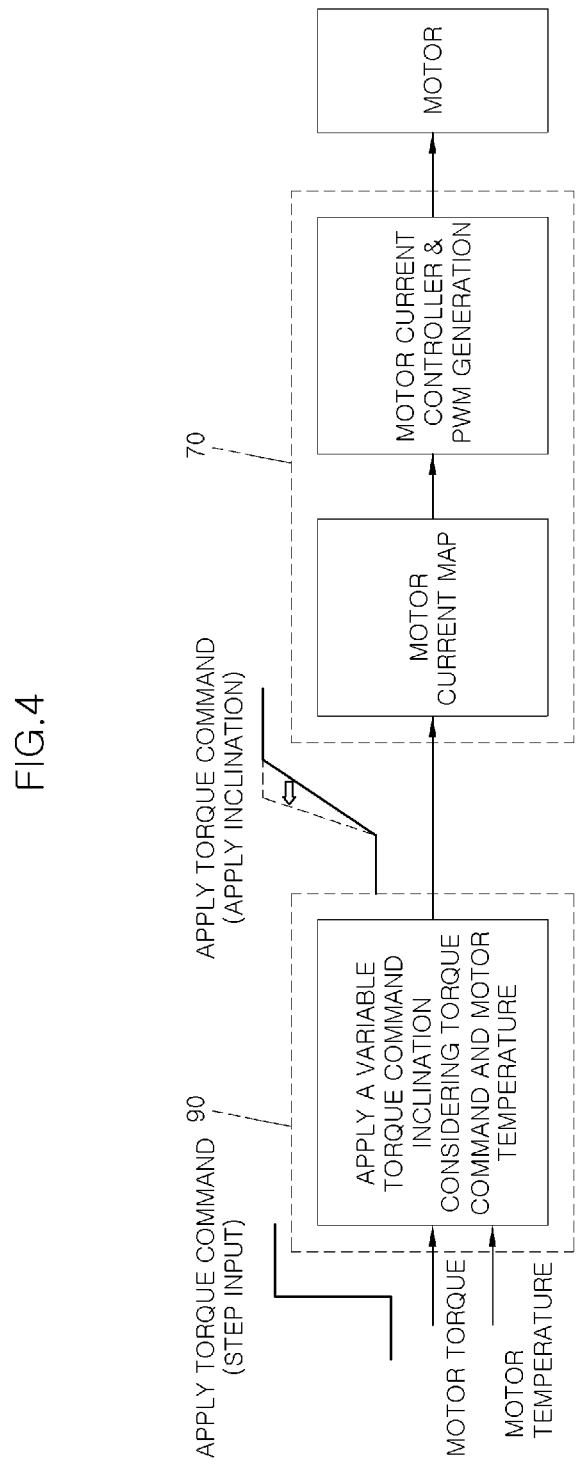
FIG. 4 is a block diagram illustrating each step upon the motor torque control in accordance with an exemplary embodiment of the present disclosure.

As illustrated in FIG. 4, when the demand torque is calculated, the controller 90 may be configured to select the inclination of the torque command to gradually change the torque amount based on the time until reaching from current motor torque to the required motor torque. To calculate the inclination of an optimum torque command that satisfies the over-current prevention and the element protection, and the responsiveness of the motor torque, the controller 90 refers to the demand torque level and the motor temperature. As described above, the demand torque of the driver was calculated before selecting the inclination of the torque command through the information related with the operation state of the acceleration pedal, the operation state of the brake pedal, the vehicle speed, and the gear stage. The motor temperature may be obtained by directly measuring the temperature of a motor coil of the motor 30 using a measurement sensor.

Figure 5:
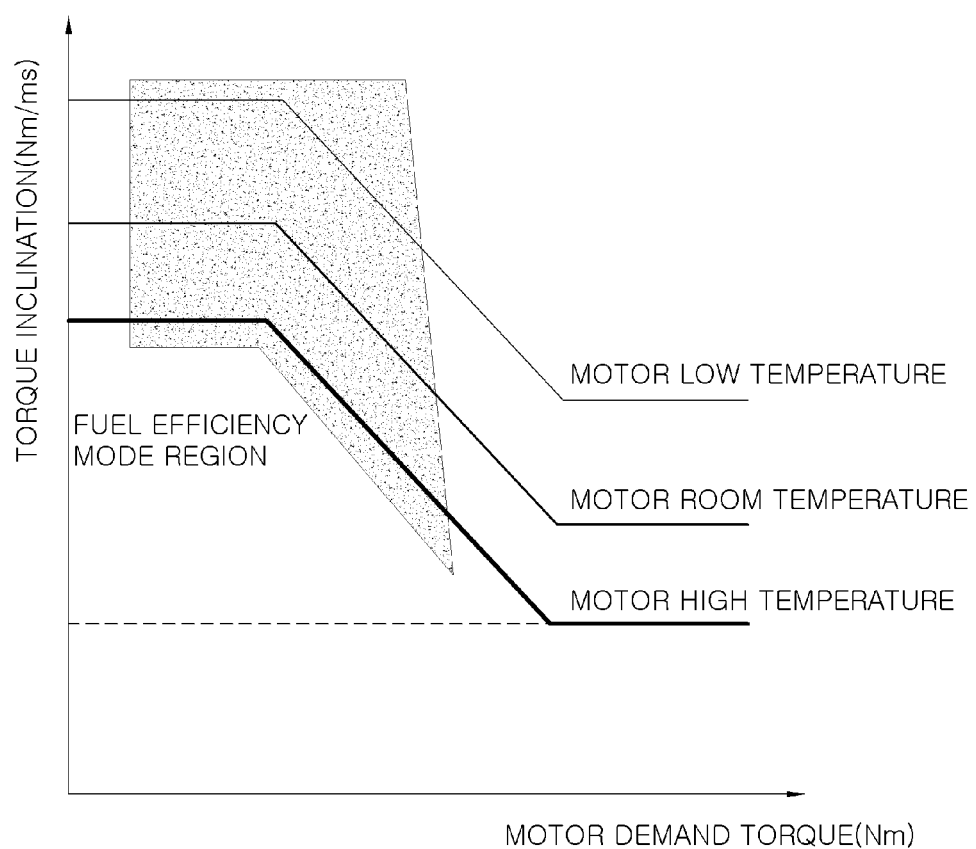
FIG. 5 is a graph illustrating the line of the inclination of the torque command upon the motor torque control in accordance with an exemplary embodiment of the present disclosure.
Figure 6:
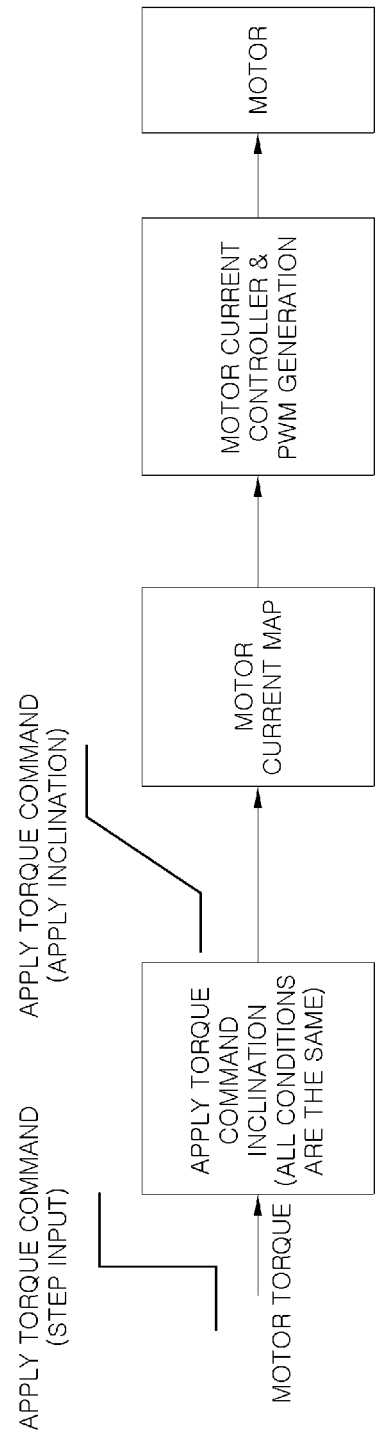
FIG. 6 is a block diagram illustrating each step upon the motor torque control in accordance with the conventional control method.

As illustrated in FIG. 5, the controller 90 may be configured to gradually change the inclination as the motor demand torque increases. In other words, the controller 90 may be configured to minimally increase the inclination of the torque command in the low torque region and reduce the inclination of the torque command in the high torque region. When the torque command is large, that is, when the demand torque is large, the motor current is large. In other words, there is a high possibility that the over-current occurs, and thus, damage to the element may occur.

Accordingly, when the demand torque is substantial, the inclination of the torque command may be reduced. Since the motor current is low when the demand torque is minimal, the possibility of over-current occurring decreases. In addition, when the demand torque is low, the vehicle mainly drives at a constant speed. In particular, when the inclination of the torque command is low, the time to reach the demand torque is excessively low and accordingly, the drivability may deteriorate and the fuel efficiency may decrease. Accordingly, the inclination of the torque command is selected as a relatively large value. The motor demand torque can be less than 20~30% of full scale of the motor torque (min), less than 70~80% of full scale of the motor torque (middle) or less than 100% of full scale of the motor torque (max).

The inclination of the torque command is determined by weighting minimum value (Nm/ms) of the inclination of the torque. The minimum value of the inclination of the torque is a maximum value in which the motor and inverter hardware is not failed in an extreme condition of the motor temperature and torque and generally given as specification by motor or inverter makers. The weighting value is basically determined by the ratio of maximum motor torque and torque command. Preferably, the weighting value can be corrected by additional weighting value (more than 0 and, less than or equal to 1) according to the temperature of the motor and motor demand torque. For example, if the maximum motor torque is 400 Nm and the torque command is 200 N/m, then the weighting value is 2 (=400 Nm,/200 Nm) and the weighting value can be corrected by multiplying it by the additional weighting value according to the temperature of the motor and motor demand torque, if needed. In this case, the inclination of the torque command can be determined by multiplying the minimum value of the inclination of the torque by the weighting value or the corrected weighting value.

As illustrated in FIG. 5, the controller 90 may be configured to gradually change the inclination as the temperature of the motor 30 increases. In other words, the controller 90 may be configured to select the inclination of the torque command as a relatively large value when the motor temperature is in a low temperature, and select the inclination of the torque command as a relatively small value when the motor temperature is in a high temperature. The motor generally uses magnet, and thus, when the motor temperature is high, the strength of the magnet is weakened and more current flows to the motor to generate the same torque. A desirable maximum temperature of the motor is 150~200° C. and minimum temperature range is −10~40° C.

Accordingly, there is a high possibility that the over-current occurs in the motor compared to when the motor temperature is low, thus increasing the risk of damage to the element. Thus, the inclination of the low torque command may be selected in spite of the concern on the reduction in the responsiveness. On the contrary, there is a low possibility that the over-current occurs in the motor when the motor temperature is low, and thus, the inclination of the torque command is highly maintained to improve the responsiveness of the motor torque.

Meanwhile, as illustrated in FIG. 5, the controller 90 may be configured to select the inclination of the torque command considering the demand torque and the motor temperature together. The inclination of the torque command having a relatively small value may be selected when the motor demand torque is large in the same motor temperature. In addition, in the same motor demand torque amount, the inclination of the torque command having a low value may be selected as the motor temperature is high.

Meanwhile, as illustrated in FIG. 5, the inclination of the torque command may be constantly maintained in the low-torque region and the high-torque region of a predetermined range at the same motor temperature regardless of the size change in the demand torque, and the inclination of the torque command may be changed based on the size of the motor demand torque in the region therebetween. In a particular low-torque region, the responsiveness improvement of the motor torque is the dominant factor in selecting the inclination of the torque command, such that the inclination is maintained regardless of the change in the torque size. However, in a particular high-torque region, the element damage prevention due to the over-current is the dominant factor in selecting the inclination of the torque command, such that the inclination is maintained regardless of the change in torque size. Meanwhile, in the region between the low and high torque regions, as described above, the inclination of different torque command may be selected based on the size of the demand torque to consider both the responsiveness improvement of the motor torque and the element protection.

As described above, in the conventional control method illustrated in FIG. 7, the inclination of the torque command is fixed to the lowest inclination assuming the worst condition regardless of the size of the demand torque or the motor temperature, while in the present disclosure, the inclination of different torque command may be selected considering at least any one factor of the motor demand size and the motor temperature.

Meanwhile, when the inclination of the torque command is selected, the torque command may be delivered to the motor controller 70 to gradually increase the torque of the motor 30 based on the inclination of the corresponding torque command. When receiving the torque command, the motor controller 70 may be configured to calculate the motor current that corresponds to the torque command value using the torque command value and a motor current map generated based on the motor torque and the motor current. When the motor current is calculated using the motor current map, a pulse width modulation (PWM) duty may be calculated using the current calculated in the motor current controller, and the motor 30 may be operated based on the PWM duty.

According to the exemplary embodiment of the present disclosure described above, it may be possible to improve the responsiveness of the motor torque while preventing the over-current of the motor to prevent the damage to the element. The responsiveness improvement of the motor torque improves the starter responsiveness and the fuel efficiency particularly in the hybrid vehicle illustrated in FIG. 1. As illustrated in FIG. 1, in the system that the engine 10 and the motor for the starter of the hybrid starter and generator (HSG) 15 may be connected to a belt, etc., when the inclination of the motor torque command is increased, the cranking time of the engine using the motor may be decreased. Accordingly, particularly such as upon switching from the EV mode into the HEV mode, when it is necessary to synchronize the speeds of the engine 10 and the motor 30, it may be possible to enhance the linearity of the speed tracking. Thus, it may be possible to obtain the control robustness of the rotation speed of the engine 10 and the motor 30, thus decreasing the time required for engaging the engine clutch 20, while minimizing the engagement impact when engaging the engine clutch, thus enhancing the drivability.

Figure 3:
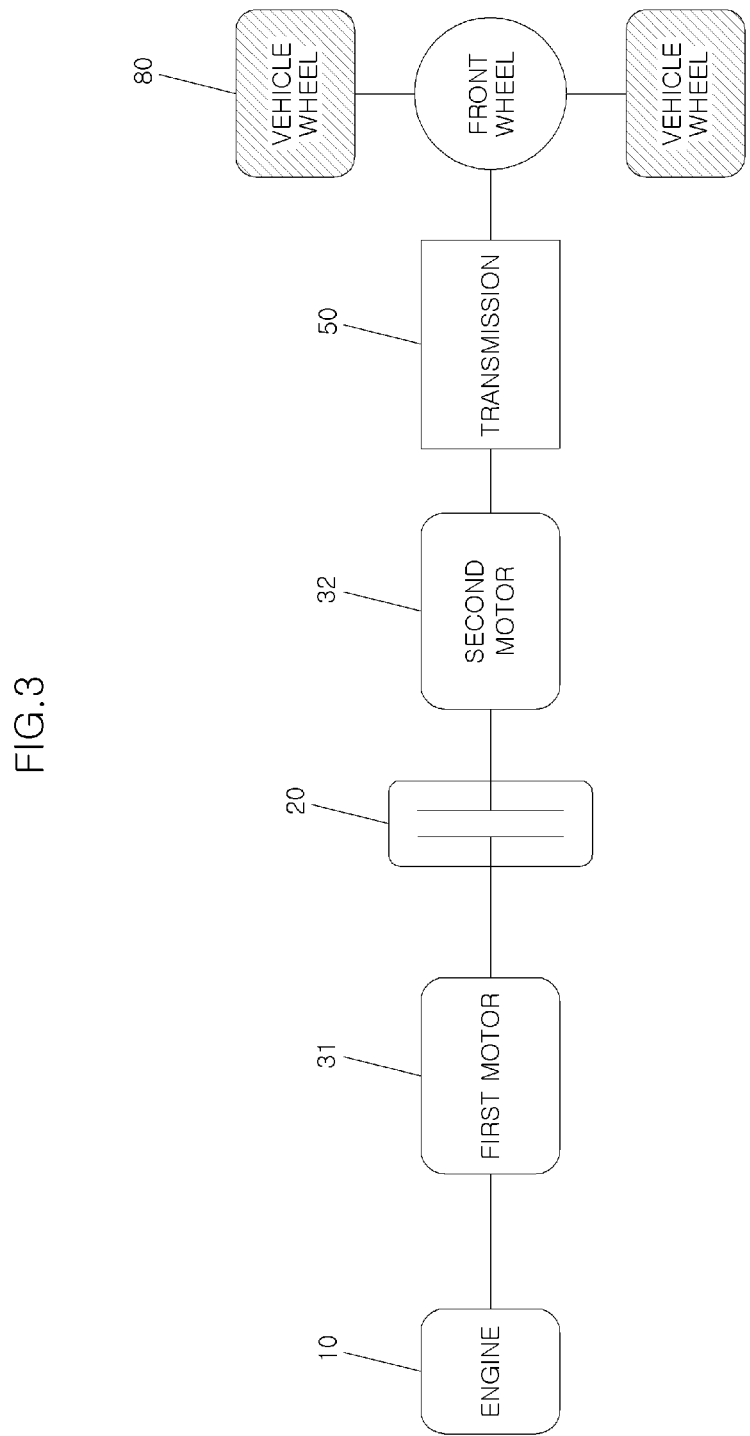
FIG. 3 is a diagram illustrating a hybrid vehicle in accordance with an exemplary embodiment of the present disclosure.

The motor torque control method of the present disclosure described above is not limited to the hybrid vehicle illustrated in FIG. 1. FIG. 3 illustrates the hybrid vehicle having a structure different from in FIG. 1. Unlike FIG. 1 in which the engine 10 and the motor for starter of the hybrid starter and generator (HSG) 15 are connected in parallel, in FIG. 3, a first motor 31, may be directly connected with the engine 10, and also directly connected with a second motor 32 via the engine clutch 20. In this structure, since the first motor may be directly connected with the engine 10, the first motor 31 may replace the function of the fly wheel 11 in FIG. 1.

In other words, the first motor 31 instead of the fly wheel 11 may mitigate the torque fluctuation generated in each explosion stroke of the multi-cylinder engine. Accordingly, when the first motor 31 is operated using the torque control method of the present disclosure described above, it may be possible to improve the responsiveness of the motor torque, thus enhancing the attenuation control reactivity of the first motor 31 with respect to the torque fluctuation of the engine 10. Accordingly, the noise and vibration occurrence of the engine 10 may be suppressed.

Moreover, the exemplary embodiment of the present disclosure may further include the engine controller 60 configured to operate the engine to change the engine torque based on the inclination of the engine torque. Upon driving the hybrid vehicle in the HEV mode, the engine torque may be the torque amount excluding the motor demand torque from total demand torque of the driver. Accordingly, upon the engine torque command, considering the size of the motor demand torque, the total demand torque amount, and the inclination of the motor torque command, the inclination of the engine torque may be selected.

Upon switching from the EV mode into the HEV mode, to synchronize the speeds of the engine 10 and the motor 30, the appropriate inclination of the engine torque command may be selected considering the size of the motor torque, the inclination of the motor torque command, etc. When selecting the inclination of the engine torque command, the engine controller 60 may be configured to adjust the fuel supply amount and the ignition angle to gradually change the torque of the engine 10 based on the inclination of the corresponding torque command.

Figure 2:
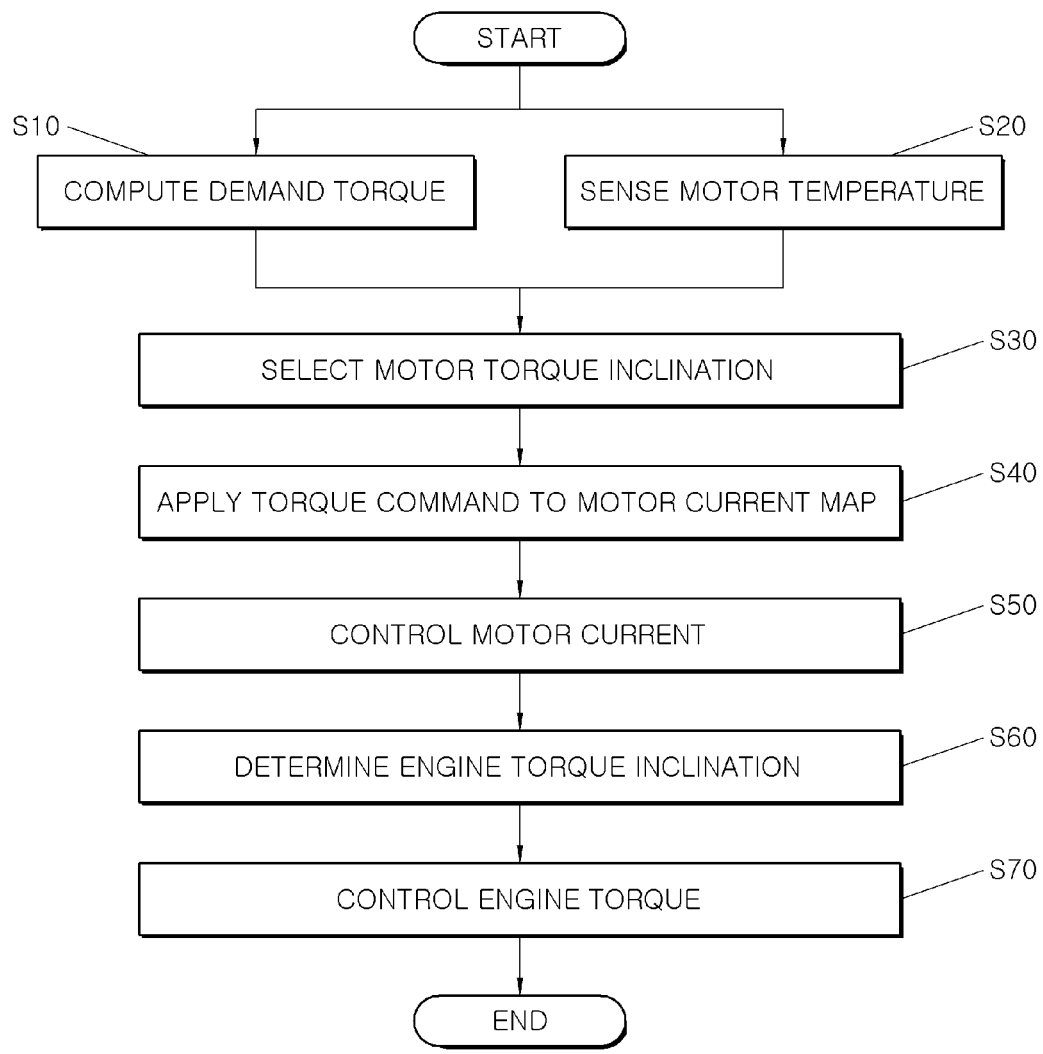
FIG. 2 is a flowchart illustrating a method of controlling a vehicle in accordance with an exemplary embodiment of the present disclosure.

FIG. 2 is a flowchart illustrating the exemplary embodiment of the control method of the present disclosure. As described above, the controller 90 may be configured to calculate the demand torque of the driver (S10), and detect the temperature of the motor 30 (S20) to select the appropriate inclination of the motor torque command. Additionally, the controller 90 may be configured to select the inclination of the motor torque command based on any one of the demand torque amount and the motor temperature (S30). The demand torque amount and the motor temperature are related to the independent condition in which the over-current occurs in the motor 30, respectively, such that the inclination of the motor torque command may be calculated based on only any one of the two conditions of the demand torque amount and the motor temperature.

However, from the viewpoint of improving the responsiveness of the motor torque while excluding the possibility of the element damage due to the motor over-current, the inclination of the motor torque command may be selected considering the two factors together. When the inclination of the motor torque command is selected, as described above, the higher the demand torque amount and the higher the motor temperature, the relatively low inclination of the torque command may be selected. The inclination of the torque command for each motor temperature and each demand torque size may be determined through the predetermined map pre-generated as illustrated in FIG. 5.

When the inclination of the motor torque command is selected, the controller 90 may be configured to deliver the torque command to the motor current map of the motor controller 70 based on the corresponding inclination (S40). When receiving the torque command, the motor controller 70 may be configured to calculate the motor current that corresponds to the torque command value using the torque command value and the motor current map generated based on the motor torque and the motor current. Additionally, the motor controller 70 may be configured to calculate the pulse width modulation (PWM) duty using the calculated current, and operate the motor 30 based on the PWM duty (S50).

Further, considering the size of the required motor torque, total demand torque amount and the inclination of the motor torque command, the present disclosure may include selecting the inclination of the engine torque (S60). When the appropriate inclination of the engine torque by the engine controller 60 is selected, the engine controller 60 may be configured to adjust the engine torque by adjusting the fuel supply amount and the ignition angle to gradually change the torque of the engine 10 based on the inclination of the corresponding torque command.

Figure 8A:
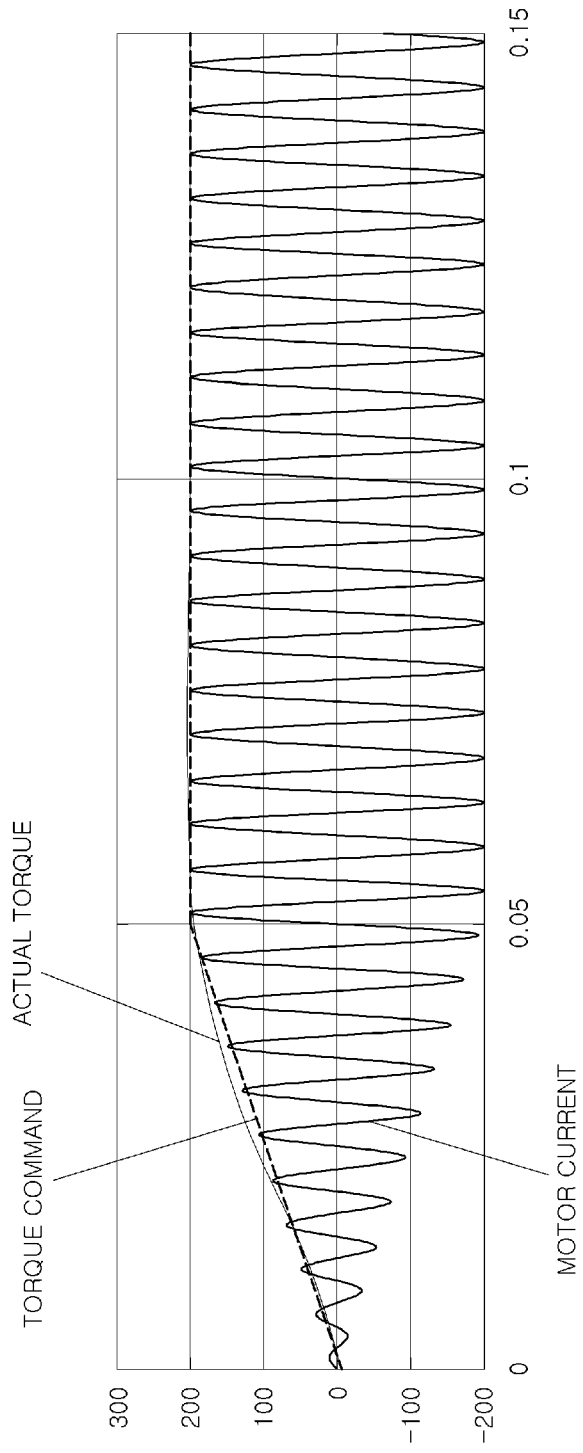
FIG. 8A is a graph illustrating the result that performs the motor torque control by applying the conventional control method.

FIG. 8A is a graph illustrating the result that embodies the motor torque control by applying the conventional control method, and FIG. 8B is a graph illustrating the result that embodies the motor torque control by applying the method in accordance with the present disclosure.

The experimental results of FIG. 8A and FIG. 8B are the results that apply the conventional control method and the control method of the present disclosure when each torque command is in the middle torque range (e.g., the torque command of the maximum torque 400 Nm reference motor to 200 Nm). It can be seen that in the example of FIG. 8A applying the conventional control method, as a result of applying the inclination (400 Nm/100 ms) of the torque command regardless of the demand torque amount, the target torque is reached at about 50 m/s; and in FIG. 8B applying the control method of the present disclosure, by changing the inclination of the torque command by a factor of two (800 Nm/100 ms), the motor current increases more rapidly and the time to reach the target torque is only half (25 ms) of the example of FIG. 8B.

As shown be seen in the above examples, when the control method of the present disclosure is applied, it may be possible to dramatically improve the responsiveness of the motor torque. In addition, in the present disclosure, it may be possible to achieve the above effect without requiring an expensive separate component. Accordingly, it may be possible to achieve the effects that enhance the fuel efficiency, suppress the occurrence of the noise and vibration, and improve the drivability without increasing the production costs.

What is claimed is:

1. A vehicle having a drive motor, comprising:
   a controller configured to change an inclination of a drive motor torque command based on a demand torque of a driver or a temperature of a drive motor; and
   a motor controller configured to operate the drive motor to change the motor torque based on the inclination of the motor torque command,
   wherein the inclination of the motor torque command indicates an inclination of the torque command to gradually change the torque amount based on time until reaching from a current motor torque to a required motor torque.

2. The vehicle having the drive motor of claim 1, wherein the controller is configured to reduce the inclination of the drive motor torque command as the demand torque increases.

3. The vehicle having the drive motor of claim 1, wherein the controller is configured to reduce the inclination of the drive motor torque command as the temperature of the drive motor increases.

4. The vehicle having the drive motor of claim 1, wherein the controller is configured to:
   change the inclination of the drive motor torque command based on the demand torque of the driver and the temperature of the drive motor,
   reduce the inclination of the drive motor torque command as the demand torque increases, and
   reduce the inclination of the drive motor torque command as the temperature of the drive motor increases.

5. The vehicle having the drive motor of claim 4, wherein the controller is configured to:
   maintain the inclination of the drive motor torque command constant based on the change in the demand torque value in a low-torque region and a high-torque region of a predetermined range when the temperature of the drive motor is constant; and
   change the inclination of the drive motor torque command based on the change in the demand torque value between the low-torque region and the high-torque region.

6. The vehicle having the drive motor of claim 1, wherein the vehicle is a hybrid vehicle operated by an engine and the drive motor, and wherein the controller is a hybrid controller.

7. The vehicle having the drive motor of claim 6, wherein the vehicle further includes:
an engine controller configured to operate the engine to change the engine torque based on the inclination of the engine torque command, and determine the inclination of the engine torque command based on the demand torque and the inclination of the motor torque command.

8. The vehicle having the drive motor of claim 6, wherein the controller is configured to change the inclination of the drive motor torque command when switching from an electric vehicle (EV) mode into a hybrid electric vehicle (HEV) mode.

9. The vehicle having the drive motor of claim 6, wherein the vehicle includes:
a first drive motor having an input shaft directly connected with the engine; and
a second drive motor being connected to the first drive motor via a clutch.

10. A method of controlling a vehicle having a drive motor, comprising:
computing, by a controller, a demand torque of a driver;
measuring, by the controller, a temperature of the drive motor;
changing, by the controller, the inclination of a drive motor torque command based on a size of the demand torque of the driver or the temperature of the drive motor; and
operating, by the controller, the drive motor to change the motor torque based on the changed inclination of the motor torque command,
wherein the inclination of the motor torque command indicates an inclination of the torque command to gradually change the torque amount based on time until reaching from a current motor torque to a required motor torque.

11. The method of controlling the vehicle having the drive motor of claim 10, wherein the demand torque of the driver is computed by at least one selected from the group consisting of: an operation state of an acceleration pedal, an operation state of a brake pedal, a vehicle speed, or a gear stage.

12. The method of controlling the vehicle having the drive motor of claim 10, wherein the changing of the inclination of the drive motor torque command reduces the inclination of the drive motor torque command as the demand torque increases.

13. The method of controlling the vehicle having the drive motor of claim 10, wherein the changing of the inclination of the drive motor torque command reduces the inclination of the drive motor torque command as the temperature of the drive motor increases.

14. The method of controlling the vehicle having the drive motor of claim 10, wherein the changing of the inclination of the drive motor torque command reduces the inclination of the drive motor torque command as the demand torque increases, and reduces the inclination of the drive motor torque command as the temperature of the drive motor increases.

15. The method of controlling the vehicle having the drive motor of claim 10, wherein when the temperature of the drive motor is constant, the inclination of the drive motor is maintained constant based on the change in the demand torque value in a low-torque region and a high-torque region of a predetermined range, and the inclination of the drive motor changes based on the change in the demand torque value between the low-torque region and the high-torque region.

16. The method of controlling the vehicle having the drive motor of claim 10, further comprising:
determining, by the controller, the inclination of the torque command of an engine torque based on the demand torque and the inclination of the motor torque command; and
adjusting, by the controller, the engine torque based on the determined inclination of the torque command of the engine torque.

* * * * *